US009356693B1

(12) United States Patent  
Hematy

(10) Patent No.: US 9,356,693 B1  
(45) Date of Patent: *May 31, 2016

(54) OPTICAL ISOLATOR PREVENTIVE MEASURE INDICATOR

(71) Applicant: Maxim Integrated Products, Inc., San Jose, CA (US)

(72) Inventor: Arman Hematy, San Jose, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/140,746

(22) Filed: Dec. 26, 2013

Related U.S. Application Data

(60) Provisional application No. 61/811,367, filed on Apr. 12, 2013.

(51) Int. Cl.
 H04B 10/08 (2006.01)
 H04B 10/079 (2013.01)
 H04B 10/25 (2013.01)

(52) U.S. Cl.
 CPC .......... *H04B 10/07955* (2013.01); *H04B 10/25* (2013.01)

(58) Field of Classification Search
 CPC .. H04B 10/802; H04B 1/48; H04B 10/07955; H04B 10/07953; H04B 10/0799; H04B 10/0771; H04B 10/25; H04B 10/0775; H04B 10/0795; H04B 2210/08; H04B 10/07; H04B 10/40; H04B 1/0475; H04B 1/109; H04B 1/40; H04B 14/06; H04B 1/16; G01J 1/0459; G02F 7/00; H04J 14/0227

USPC ............... 398/25, 37, 38, 140, 154, 155, 202, 398/208, 210, 10, 17, 20, 24, 28, 21, 137, 398/163

See application file for complete search history.

(56) References Cited

U.S. PATENT DOCUMENTS

| 6,731,967 B1* | 5/2004 | Turcott ................. 600/407 |
| 6,990,155 B2* | 1/2006 | Adachi et al. ............. 375/298 |
| 7,013,090 B2* | 3/2006 | Adachi et al. ............. 398/183 |
| 8,692,200 B2* | 4/2014 | Tao et al. ................. 250/338.4 |
| 8,953,950 B2* | 2/2015 | Nazarathy et al. ......... 398/203 |
| 2005/0213969 A1* | 9/2005 | Hakomori ................ 398/33 |
| 2009/0324231 A1* | 12/2009 | Nakano .................. 398/79 |
| 2012/0175504 A1* | 7/2012 | Holland et al. ........... 250/214 A |
| 2013/0039648 A1* | 2/2013 | Uo ...................... 398/25 |

OTHER PUBLICATIONS

Data Sheet—HCPL-7860/HCPL-786J; Optically Isolated Sigma-Delta (S-D) Modulator; Avago Technologies; pp. 1-18.
Data Sheet—ACPL-C797; Optically Isolated Sigma-Delta Modulator; Avago Technologies; pp. 1-16.

* cited by examiner

*Primary Examiner* — Hibret Woldekidan
(74) *Attorney, Agent, or Firm* — Advent, LLP

(57) ABSTRACT

A system includes a light emitting device on a first side of electrically isolated circuitry for transmitting an optical signal to a second side of the electrically isolated circuitry. The system also includes an optical receiver on the second side of the electrically isolated circuitry for receiving the optical signal from the light emitting device. The system further includes a sensor coupled with the optical receiver for sampling the intensity of the optical signal received by the optical receiver.

13 Claims, 3 Drawing Sheets

OPTICAL ISOLATOR PREVENTIVE MEASURE INDICATOR

CROSS-REFERENCE TO RELATED APPLICATIONS

The present application claims the benefit under 35 U.S.C. §119(e) of U.S. Provisional Application Ser. No. 61/811,367, filed Apr. 12, 2013, and titled "OPTICAL ISOLATOR PREVENTIVE MEASURE INDICATOR," which is herein incorporated by reference in its entirety.

BACKGROUND

Industrial and process control systems include various types of control equipment used in industrial production, such as supervisory control and data acquisition (SCADA) systems, distributed control systems (DCS), and other control equipment using, for example, programmable logic controllers (PLC). These control systems are typically used in industries including electrical, water, oil, gas, and data. Using information collected from remote stations in the field, automated and/or operator-driven supervisory commands can be transmitted to field control devices. These field devices control local operations, such as the speed of an electrical motor. Industrial control systems/process control systems may require electrical isolation between power transmission and control equipment. For example, optical equipment can be used for signal transmission to electrically isolate devices, prevent ground loops, and so forth.

SUMMARY

A system includes a light emitting device on a first side of electrically isolated circuitry for transmitting an optical signal to a second side of the electrically isolated circuitry. The system also includes an optical receiver on the second side of the electrically isolated circuitry for receiving the optical signal from the light emitting device. The system further includes a sensor coupled with the optical receiver for sampling the intensity of the optical signal received by the optical receiver.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Figure 1:
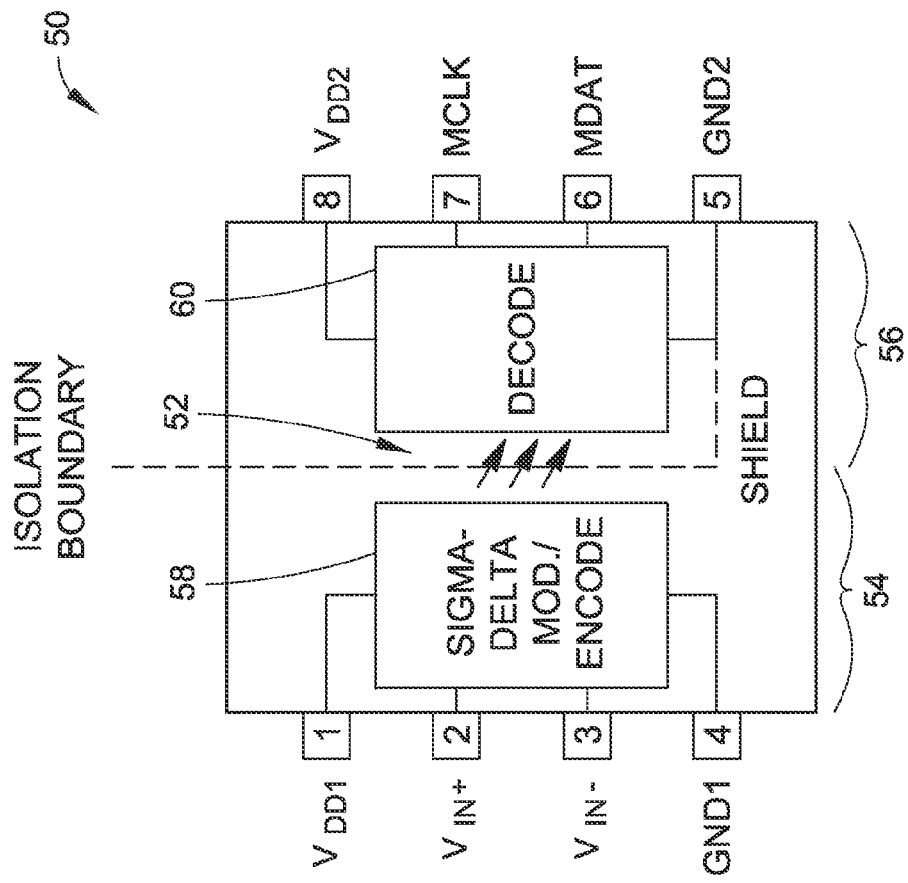
FIG. 1 is a diagrammatic illustration of a system that provides electrical isolation using an optical link.

Referring generally to FIG. 1, a system 50 providing optical coupling is described. The system 50 includes a unidirectional optical link 52 that provides communication (e.g., from a first side 54 of the system 50 to a second side 56 of the system 50). On the first side 54, a sigma-delta modulator/encoder 58 is used to furnish, for example, a clock signal, which is transmitted to a decoder 60 on the second side 56 via the optical link 52. In the configuration shown in FIG. 1, the optical link 52 is generally subject to an unpredictable life span. For example, as a typical light emitting diode (LED) ages, the signal strength from the LED gradually diminishes until it is no longer detectable by associating receiving hardware. Thus, in an industrial environment, such as a factory, optical links are typically replaced periodically in an attempt to avoid operational failure (e.g., at between five (5) and six (6) years of operation). However, in some cases an optical link may still be functional when it is replaced, while in other cases an optical link may fail before it is replaced.

Figure 2:
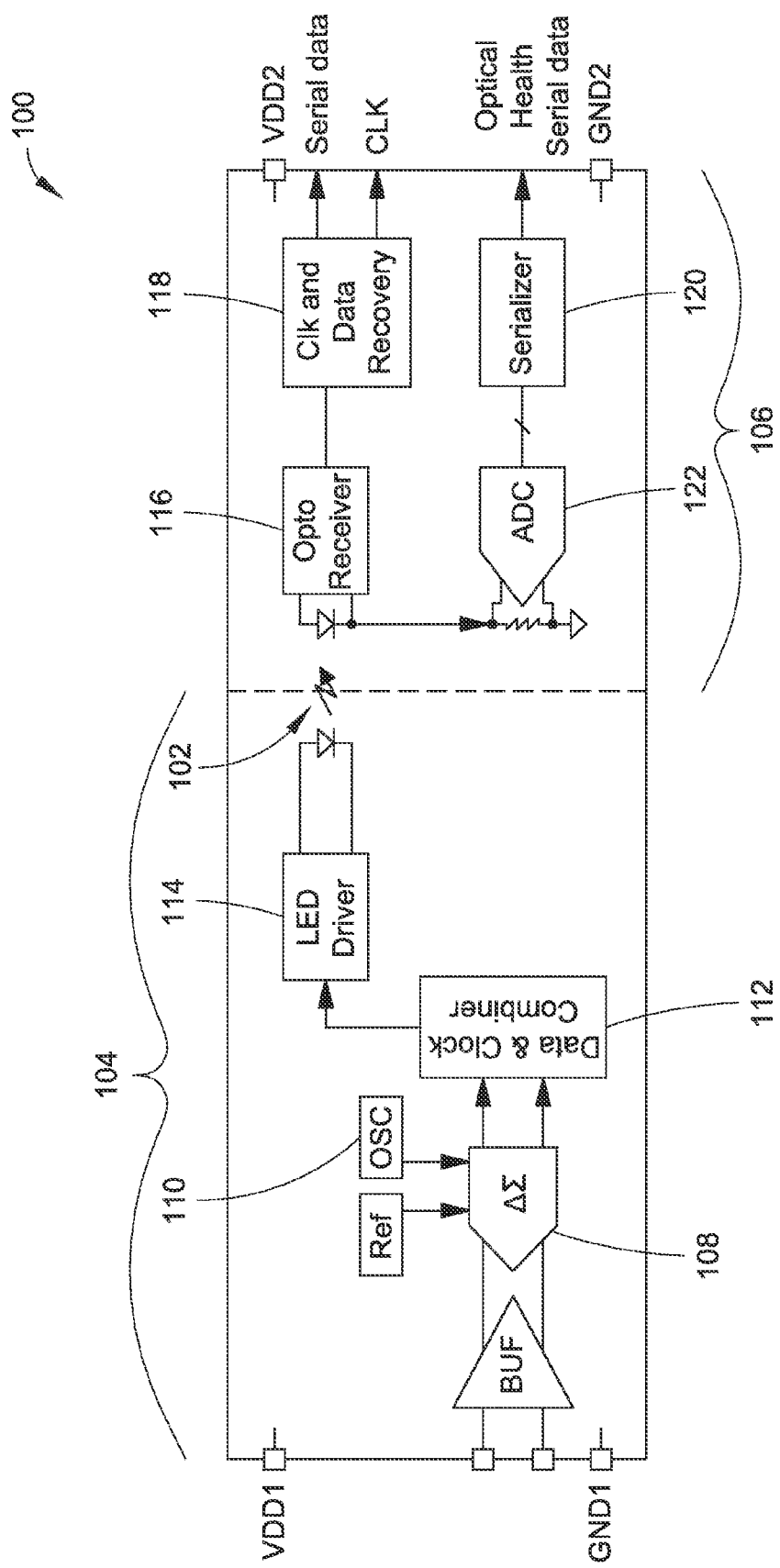
FIG. 2 is a diagrammatic illustration of a system that provides electrical isolation using an optical link, where the system monitors the health of the optical link by sampling the signal strength from an LED in accordance with an example embodiment of the present disclosure.
Figure 3:
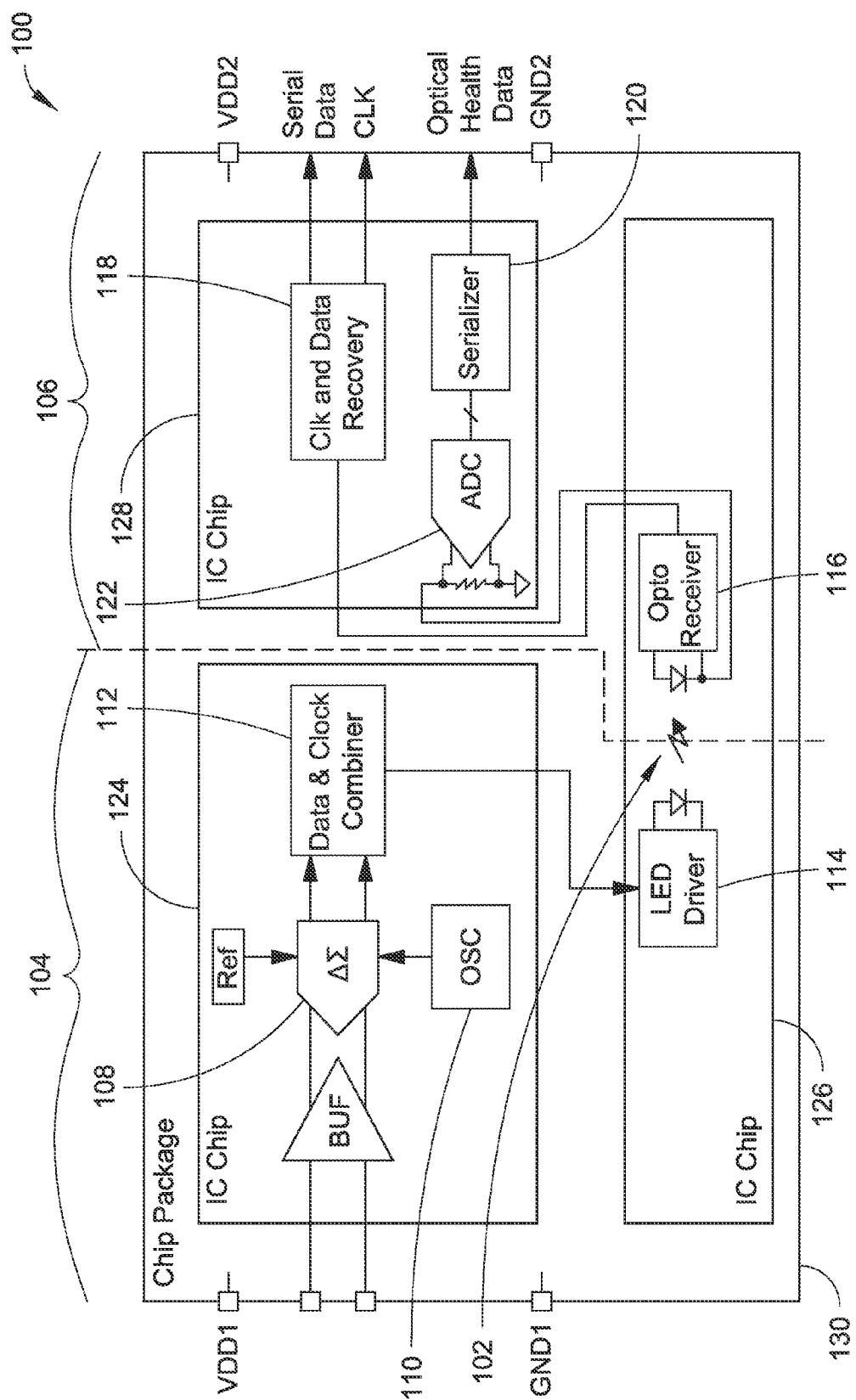
FIG. 3 is a diagrammatic illustration of a chip package that provides electrical isolation using an optical link, where the system monitors the health of the optical link by sampling the signal strength from an LED in accordance with an example embodiment of the present disclosure.

Referring generally to FIGS. 2 and 3, a system 100 providing optical coupling is described. The system 100 includes a unidirectional optical link 102 for transmitting signals from a first side 104 of the system 100 (e.g., a high voltage side) to a second side 106 of the system 100 (e.g., a low voltage side). In embodiments of the disclosure, the optical link 102 includes an LED. In some embodiments, one side of the system 100 is configured to couple with, for example, a motor, and the other side of the system 100 is configured to couple with, for example, a controller (e.g., for controlling the speed of the motor). On the first side 104 of the system, a sigma-delta modulator 108 and an associated oscillator 110 are used to provide a clock signal to data clock and combiner circuitry 112. The clock signal is transmitted to an LED driver 114 and then to an LED on the first side 104 of the system 100. The clock signal is optically transmitted from the LED to an optical receiver 116 on the second side 106 of the system 100, and then to clock and data recovery circuitry 118, serializer circuitry 120, and so forth.

In embodiments of the disclosure, a current sensor (e.g., a current sensor and digitizer such as an analog-to-digital (ADC) converter) is used to monitor the strength of the optical link. As shown, an analog-to-digital converter 122 is coupled with the optical receiver 116 to sample (e.g., detect and/or measure) the current produced in, for example, a current generating diode of the optical receiver 116, which is indicative of the received light intensity of the LED. The detected or measured current can then be used as an indication of the health of the system 100. For instance, the sampled current is reported via a digital interface of the system and used to predict end-of-life of the optical interface before it occurs. By providing information about the health of the optical link 102, the system 100 can be used with higher confidence. Further, cost savings can be achieved when a part is used longer than it might otherwise be if it were replaced at an arbitrary point in its life-cycle.

In some embodiments, current produced in current generating circuitry is sampled and/or provided continuously. In other embodiments, current is sampled and/or provided periodically (e.g., each second, daily, monthly, yearly, and so forth). Further, a sampled current value can be compared to a previously sampled value to provide an indication of the health of the optical link 102. For example, the system 100 provides a difference between a sampled current value and a previously sampled current value (e.g., via the digital interface). In some embodiments, the difference is determined using a comparator included with the system 100.

In embodiments of the disclosure, a comparison is determined between a sampled current value and a pre-determined threshold current value, which can be determined based upon, for instance, a bit slice level. In some embodiments, the difference between the sampled value and the pre-determined threshold value is provided by the system 100 (e.g., via the digital interface). In other embodiments, one or more indications are provided by the system 100 (e.g., via the digital interface) when a sampled current value exceeds a pre-determined threshold value, when a sampled current value is less than a pre-determined threshold value, when a sampled current value is at least substantially equal to a pre-determined threshold value, and so forth.

In some embodiments, other circuitry is communicatively coupled with the system 100 shown in FIG. 2. For instance, in some embodiments the system 100 includes two unidirectional optical links that provide bidirectional communication (e.g., between a high voltage side and a low voltage side). On the high voltage side, current-sense functionality is provided using the sigma-delta modulator 108 and the oscillator 110. Synchronization of the oscillator 110 is achieved via a "backwards" optical link that furnishes a clock signal from the low voltage side to the high voltage side. In some embodiments, the clock signal used on the backwards optical path is provided by, for instance, an external master clock.

Referring now to FIG. 3, in some embodiments the sigma-delta modulator 108, the oscillator 110, and the data and clock combiner circuitry 112 are provided on a first integrated circuit (IC) chip 124; the LED driver 114, LED, and optical receiver circuitry 116 of the optical link 102 are provided on a second optical isolator IC chip 126; and the ADC converter 122, serializer 120, and clock and data recovery circuitry 118 are provided on a third IC chip 128. The first, second, and third IC chips 124, 126, and 128 are included in a single chip package 130. Further, one or more pins can be included with the third IC chip 128 and/or a chip package for supplying an indication of signal intensity of the light received from the LED, and/or a comparison of signal intensity to a previously sampled signal intensity, a threshold value, and so forth. However, this configuration is provided by way of example only and is not meant to limit the present disclosure. Thus, in other configurations, the circuitry described is included on a single IC chip, is arranged differently on multiple IC chips, and so forth.

In embodiments of the disclosure, systems 100 described herein are used in one or more applications including, but not necessarily limited to: a programmable logic controller (PLC), a motor controller, a medical device, a photovoltaic (PV) solar device, a direct current-to-direct current (DC-to-DC) power inverter, and so forth. For example, the system 100 described with reference to FIGS. 2 and 3 can be implemented in industrial (e.g., industrial control) and/or automation markets.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
a light emitting diode on a first side of electrically isolated circuitry for transmitting a digital optical signal to a second side of the electrically isolated circuitry;
an optical receiver on the second side of the electrically isolated circuitry for receiving the digital optical signal from the light emitting diode; and
a sensor coupled with the optical receiver for periodically sampling the intensity of the digital optical signal received by the optical receiver to determine a health of the link between the light emitting diode and the optical receiver; and a sigma-delta modulator and an oscillator disposed on the first side of the electrically isolated circuitry and configured to provide a clock signal to the light emitting diode.

2. The system as recited in claim 1, wherein the first side of the electrically isolated circuitry is configured to operate at a higher voltage than the second side of the electrically isolated circuitry.

3. The system as recited in claim 1, further comprising clock and data recovery circuitry disposed on the second side of the electrically isolated circuitry and configured to receive the clock signal.

4. The system as recited in claim 1, wherein the sensor comprises a current sensor.

5. The system as recited in claim 4, wherein the current sensor comprises an analog-to-digital converter.

6. A system comprising:
a light emitting device on a first side of electrically isolated circuitry for transmitting a digital optical signal to a second side of the electrically isolated circuitry;
an optical receiver on the second side of the electrically isolated circuitry for receiving the digital optical signal from the light emitting device; and
a current sensor coupled with the optical receiver for periodically sampling the intensity of the digital optical signal received by the optical receiver to determine a health of the link between the light emitting diode and the optical receiver; and
a sigma-delta modulator and an oscillator disposed on the first side of the electrically isolated circuitry and configured to provide a clock signal to the light emitting device.

7. The system as recited in claim 6, wherein the first side of the electrically isolated circuitry is configured to operate at a higher voltage than the second side of the electrically isolated circuitry.

8. The system as recited in claim 6, further comprising clock and data recovery circuitry disposed on the second side of the electrically isolated circuitry and configured to receive the clock signal.

9. The system as recited in claim 6, wherein the current sensor comprises an analog-to-digital converter.

10. A chip package comprising:
a first integrated circuit chip comprising a light emitting device on a first side of electrically isolated circuitry for transmitting a digital optical signal to a second side of the electrically isolated circuitry, and an optical receiver on the second side of the electrically isolated circuitry for receiving the digital optical signal from the light emitting device; and
a second integrated circuit chip comprising a current sensor coupled with the optical receiver for periodically sampling the intensity of the digital optical signal received by the optical receiver to determine a health of the link between the light emitting device and the optical receiver; and a third integrated circuit chip comprising a sigma-delta modulator and an oscillator disposed on the first side of the electrically isolated circuitry and configured to provide a clock signal to the light emitting device.

11. The chip package as recited in claim 10, wherein the first side of the electrically isolated circuitry is configured to operate at a higher voltage than the second side of the electrically isolated circuitry.

12. The chip package as recited in claim 10, wherein the second integrated circuit chip comprises clock and data recovery circuitry disposed on the second side of the electrically isolated circuitry and configured to receive the clock signal.

13. The chip package as recited in claim 10, wherein the current sensor comprises an analog-to-digital converter.

* * * * *